United States Patent
Tsai

(10) Patent No.: US 8,243,201 B2
(45) Date of Patent: Aug. 14, 2012

(54) METHOD AND COMPUTER SYSTEM FOR REGULATING COLOR SATURATION DEGREE

(75) Inventor: Chi-Yi Tsai, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 559 days.

(21) Appl. No.: 12/469,699

(22) Filed: May 21, 2009

(65) Prior Publication Data

US 2010/0091196 A1 Apr. 15, 2010

(30) Foreign Application Priority Data

Oct. 9, 2008 (TW) .................. 97138948 A

(51) Int. Cl.
  *H04N 9/68* (2006.01)
  *H04N 5/57* (2006.01)
  *H04N 5/21* (2006.01)
  *H04N 9/65* (2006.01)
  *H04N 9/70* (2006.01)
  *G09G 5/02* (2006.01)
  *G06K 9/40* (2006.01)

(52) U.S. Cl. ........ 348/645; 348/603; 348/631; 348/642; 348/644; 345/589; 345/590; 345/591; 382/254; 382/274

(58) Field of Classification Search .................. 348/645, 348/603, 631, 642, 644; 345/589, 590, 591; 382/254, 274
See application file for complete search history.

(56) References Cited

U.S. PATENT DOCUMENTS

| | | | | |
|---|---|---|---|---|
| 5,450,217 A | * | 9/1995 | Eschbach et al. | 358/518 |
| 5,867,169 A | * | 2/1999 | Prater | 345/604 |
| 5,876,871 A | * | 3/1999 | Takizawa | 429/101 |
| 6,366,291 B1 | * | 4/2002 | Taniguchi et al. | 345/603 |
| 7,583,838 B2 | * | 9/2009 | Lee | 382/167 |
| 2003/0025835 A1 | * | 2/2003 | Segman | 348/577 |
| 2005/0047657 A1 | * | 3/2005 | Lee | 382/167 |
| 2007/0091213 A1 | * | 4/2007 | Jaspers | 348/687 |
| 2008/0055478 A1 | * | 3/2008 | Jaspers | 348/645 |
| 2008/0080784 A1 | * | 4/2008 | Ozdemir | 382/274 |

FOREIGN PATENT DOCUMENTS

TW 200629230 8/2006

* cited by examiner

*Primary Examiner* — Hoang-Vu A Nguyen-Ba
(74) *Attorney, Agent, or Firm* — Jianq Chyun IP Office

(57) ABSTRACT

The invention relates to a method and module for regulating saturation degree. In this method, a curvature of a special function in all position is regulated by a saturation parameter to obtain a regulated function. A color input signal is assigned as an independent variable of the regulated function to calculate a color output signal corresponding to the color input signal.

12 Claims, 11 Drawing Sheets

METHOD AND COMPUTER SYSTEM FOR REGULATING COLOR SATURATION DEGREE

CROSS-REFERENCE TO RELATED APPLICATION

This application claims the priority benefit of Taiwan application serial no. 97138948, filed on Oct. 9, 2008. The entirety of the above-mentioned patent application is hereby incorporated by reference herein and made a part of specification.

BACKGROUND OF THE INVENTION

1. Field of the Invention

The present invention relates to a color compensation technique. More particularly, the present invention relates to a color compensation technique considering a color characteristic of a display device itself.

2. Description of Related Art

In today's high-tech society, electronic products are widely used in people's daily life. People more and more depend on the electronic products such as televisions used for entertainment, game machines and computers used for working. Wherein, regardless of a working requirement or an entertainment requirement, display devices such as the televisions, projectors and liquid crystal displays (LCD) are indispensable.

Since color types actually displayed by different display devices are different, and in a color image technology domain, a so-called "color gamut" refers to a quantity of the color types that can be actually displayed by a color image display device. Therefore, a different display device has a unique color gamut range.

To achieve a nice color hue for a display device having a poor color performance, in a conventional technique, an extra hardware device (for example, a color enrichment chip or a color corrector, etc.) is generally used to improve the color hue of a video signal output from a display card or a display chip, so that a hardware cost thereof is increased. In case the extra hardware device is not utilized, according to the conventional technique, a central processing unit (CPU) of a computer is generally used for executing a color enrichment software, so that a calculation burden of the CPU is increased. Moreover, in the conventional technique, a color characteristic or the color gamut range of the display device itself is not taken into consideration. Therefore, when the output video signal of the display card or the display chip is displayed on the display device, the color enrichment effect is actually not fully achieved.

Moreover, in order to achieve a relatively comfortable visual enjoyment, the display chip or the display card generally has an internal regulated function, so that a user can adjust a display state (including image luminance, saturation and color temperature, etc.) thereof according to actual requirements. Taking the display card as an example, an application program is generally applied therein, so that the user can regulate the image luminance, the saturation and the color temperature, etc. via a regulation interface provided by the application program.

In the display card or the display chip, the image luminance, the saturation and the color temperature, etc. set by the user are set to gamma ramps. The display card or the display chip can regulate the video data finally output to the display device according to the gamma ramps. However, the gamma ramps have an input/output corresponding relation, so that when the user regulates the image luminance, the saturation and the color temperature, etc. via the regulation interface, the input/output corresponding relation within the gamma ramps has to be recalculated. Therefore, when the user regulates the images, if a calculation speed of the computer or the display card is excessively slow, an image delay or image flickering phenomenon is occurred.

SUMMARY OF THE INVENTION

Accordingly, the present invention is directed to a method and module for regulating saturation, by which a curvature of a specific function is regulated, so as to regulate a saturation of an input signal.

The present invention provides a method for regulating saturation degree, the method can be described as follows. First, a saturation parameter and a special function are provided, and a color input signal is received. Next, a curvature of a specific function in all positions is regulated by the saturation parameter to obtain a regulated function. Finally, the color input signal is substituted to the regulated function to calculate a color output signal corresponds to the color input signal.

In an embodiment of the present invention, the color input signal is represented by $R_{in}$, and the method for regulating saturation degree further includes providing a translation parameter represented by D, and converting the color input signal $R_{in}$ into $r_{in}$ according to the translation parameter, wherein a relation of $r_{in}$ and $R_{in}$ is $r_{in}=(R_{in}-D)/D$.

In an embodiment of the present invention, the special function is a one-to-one function represented by $Y=F(X)$.

In an embodiment of the present invention, the saturation parameter is represented by Sat, the step of regulating the curvature of the specific function in all positions by the saturation parameter to obtain the regulated function includes providing a predetermined parameter represented by $S_2$, and converting the special function into the regulated function, wherein the regulated function is represented by $Y=F[(S_2 \times Sat+1) \cdot X]$.

In an embodiment of the present invention, the color input signal is represented by $r_{in}$, and the step of substituting the color input signal to the regulated function to calculate the color output signal corresponds to the color input signal includes calculating the color output signal corresponding to the color input signal $r_{in}$ according to the regulated function, wherein the color output signal is represented by $h_r$, and a value thereof is $h_r=S_r \times F[(S_2 \times Sat+1) \cdot r_{in}]$, wherein $S_r$ is a scaling parameter.

In an embodiment of the present invention, the method for regulating saturation degree further includes: providing a strength parameter represented by Str, and regulating the color output signal $h_r$ into $r_{out}$ according to the strength parameter Str, and a value thereof is $r_{out}=(1-Str) \times r_{in}+Str \times h_r$.

In an embodiment of the present invention, the method for regulating saturation degree further includes obtaining the strength parameter Str through a regulation interface, wherein a value of the strength parameter Str is between 0-1.

In an embodiment of the present invention, the color output signal is represented by $r_{out}$, and the method for regulating saturation degree further includes providing a translation parameter represented by D, and converting the color output signal $r_{out}$ into $R_{out}$ according to the translation parameter, wherein a relation of $r_{out}$ and $R_{out}$ is $R_{out}=r_{out} \times D+D$.

In an embodiment of the present embodiment, the special function is a hyperbolic function including a hyperbolic tangent function, a hyperbolic cosine function and a hyperbolic sine function.

In an embodiment of the present invention, the color input signal belongs to a color space having a plurality of coordinates direction, and the color input signal is a component of any coordinates direction.

In an embodiment of the present invention, the method for regulating saturation degree further includes obtaining the saturation parameter through a regulation interface.

The present invention provides a saturation regulation module, the saturation regulation module receives a color input signal for regulating a saturation degree of the color input signal through a saturation parameter, which is characterized in that a curvature of a specific function in all positions is regulated by a saturation parameter to obtain a regulated function, and the color input signal is substituted to the regulated function to calculate a color output signal corresponds to the color input signal.

In the present invention, a curvature of a specific function is regulated by a saturation parameter to obtain a regulated function, and then a saturation degree of a color input signal is regulated by input/output of the regulated function.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
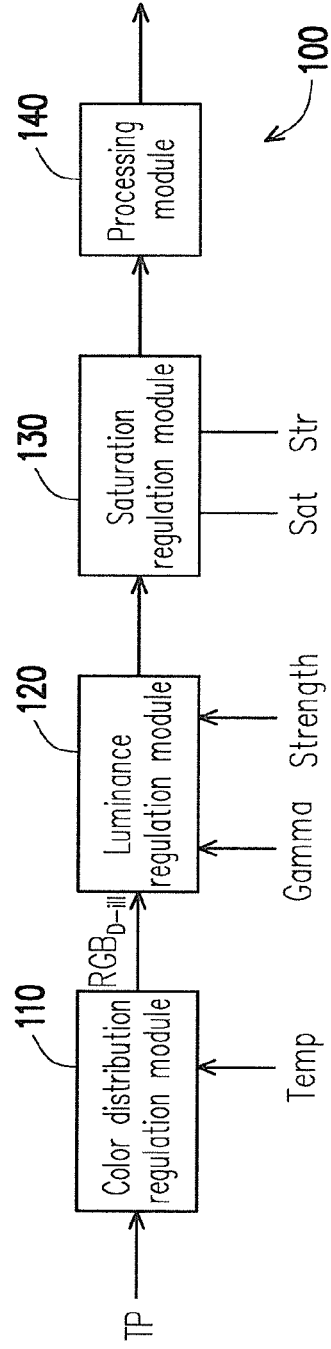
FIG. 1 is a system block diagram illustrating a color regulation system according to an embodiment of the present invention.

FIG. 1 is a system block diagram illustrating a color regulation system according to an embodiment of the present invention. Referring to FIG. 1, the color regulation system 100 includes a color distribution regulation module 110, a luminance regulation module 120, a saturation regulation module 130 and a processing module 140. To achieve a better color regulating effect, a color test pattern is applied to the present embodiment. The color distribution regulation module 110 regulates a color distribution and a color temperature of the color test pattern. The luminance regulation module 120 regulates a luminance of the color test pattern, and then the saturation regulation module 130 regulates a saturation degree of the color test pattern. Finally, the processing module 140 obtains gamma ramps by calculation according to the regulated color test pattern.

However, those skilled in the art should understand that during the aforementioned regulating processes, operations of the color distribution regulation module 110, the luminance regulation module 120 and the saturation regulation module 130 are not sequential, and if only a part of color features is required to be regulated, only one of or two of the color distribution regulation module 110, the luminance regulation module 120 and the saturation regulation module 130 is applied.

Figure 2:
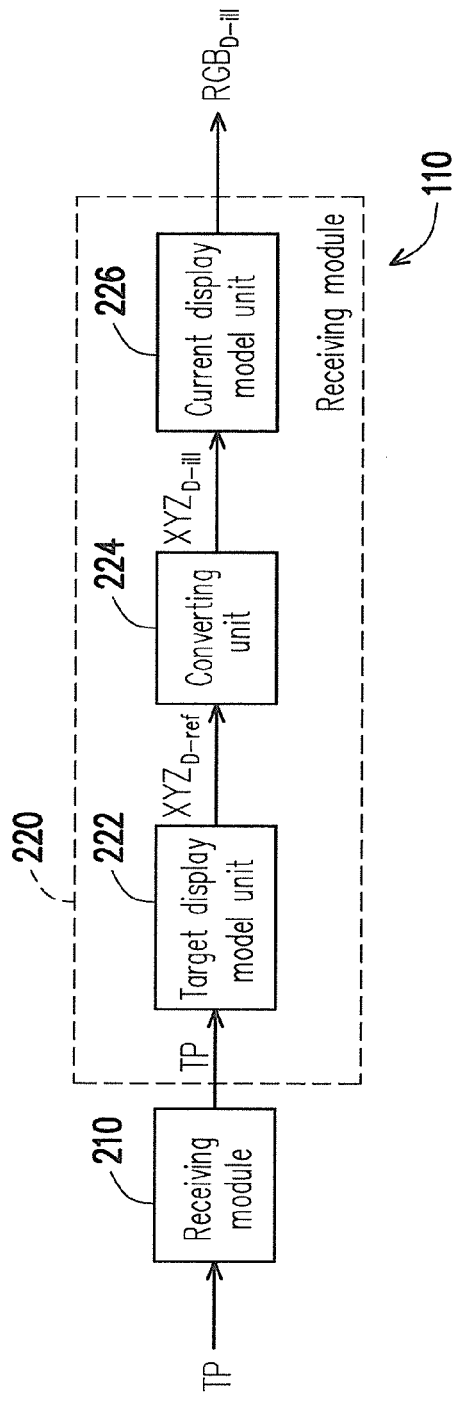
FIG. 2 is a block diagram illustrating a color distribution regulation module 110 of a color regulation system 100.

FIG. 2 is a block diagram illustrating the color distribution regulation module 110 of the color regulation system 100. Referring to FIG. 2, the color distribution regulation module 110 includes a receiving module 210 and a converting module 220. Wherein, the converting module includes a target display model unit 222, a converting unit 224 and a current display model unit 226. In the present embodiment, taking the color distribution regulation module 110 as an example, it executes a color distribution regulation method, which is shown as a flowchart of FIG. 3. In the following content, regulations of the color distribution and the color temperature are described in coordination with the color distribution regulation method.

Figure 3:
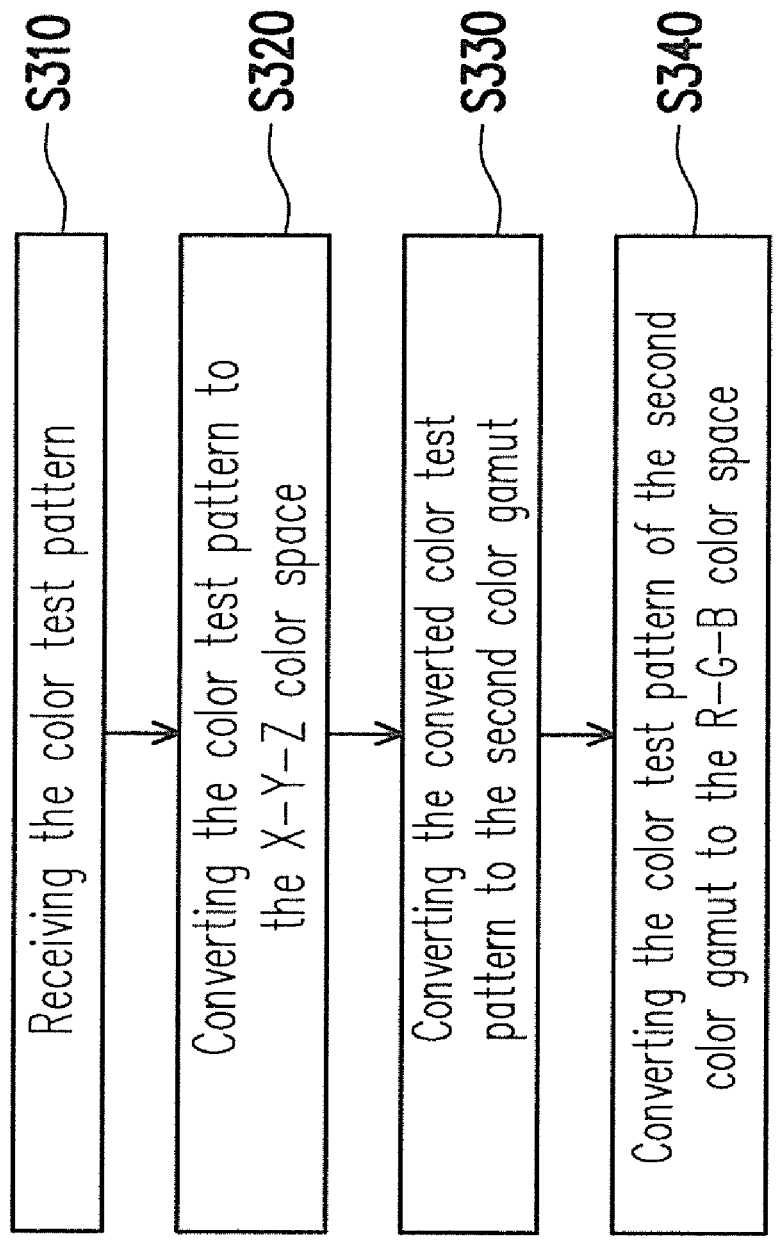
FIG. 3 is a flowchart illustrating a color distribution regulation method according to an embodiment of the present invention.

Referring to FIG. 2 and FIG. 3, first, the receiving module 210 receives the color test pattern (step S310), wherein the color test pattern can be randomly generated by a computer or a display card, or can be pre-stored in the computer. For simplicity's sake, the received color test pattern is represented by $\underline{\underline{TP}}$, assuming the color test pattern belongs to a R-G-B color space, and the color test pattern $\underline{\underline{TP}}$ respectively contains L gray-levels corresponding to the RGB three coordinates directions, so that the color test pattern $\underline{\underline{TP}}$ can be represented by a matrix:

$$\underline{\underline{TP}} = \begin{bmatrix} r_0 & g_0 & b_0 \\ r_1 & g_1 & b_1 \\ \vdots & \vdots & \vdots \\ r_{L-1} & g_{L-1} & b_{L-1} \end{bmatrix}_{L \times 3}.$$

In the present embodiment, a value of L is 256. To clarify the following mathematic equations, if a mathematic symbol represents a matrix, double bottom lines are added to the symbol, such as $\underline{\underline{TP}}$. If the mathematic symbol represents a vector, a single bottom line is added to the symbol, and if the mathematic symbol represents a scalar, none bottom line is added to the symbol.

Next, the target display model unit 222 applies a target display model to convert the color test pattern $\underline{\underline{TP}}$ to a X-Y-Z color space (step S320), so that the color test pattern $\underline{\underline{TP}}$ is distributed to a first color gamut, wherein the first color gamut is a color gamut of a color distribution of a target display. In other words, the color test pattern TP converted by the target display model unit 222 is distributed to the color gamut of the color distribution of the target display in the X-Y-Z color space. In the present embodiment, the target display is a display having a better color performance, and the target display model is a N×N matrix represented by $\underline{\underline{M_T}}$, wherein N is a dimension of the color space, and in the present embodiment, a value of N is 3. The color test pattern $\underline{\underline{TP}}$ converted by the target display model unit 222 is represented by $XYZ_{D\text{-}ref}$, and a value thereof is $XYZ_{D\text{-}ref}=M_T TP$.

Next, the converting unit 224 converts the converted color test pattern $XYZ_{D\text{-}ref}$ to a second color gamut within the X-Y-Z color space via a converting model (step S330), wherein the second color gamut is a color gamut of a color distribution of a current display, and the current display is a currently driven display. The step S330 further includes a plurality of sub steps, which are shown as FIG. 4.

Figure 4:
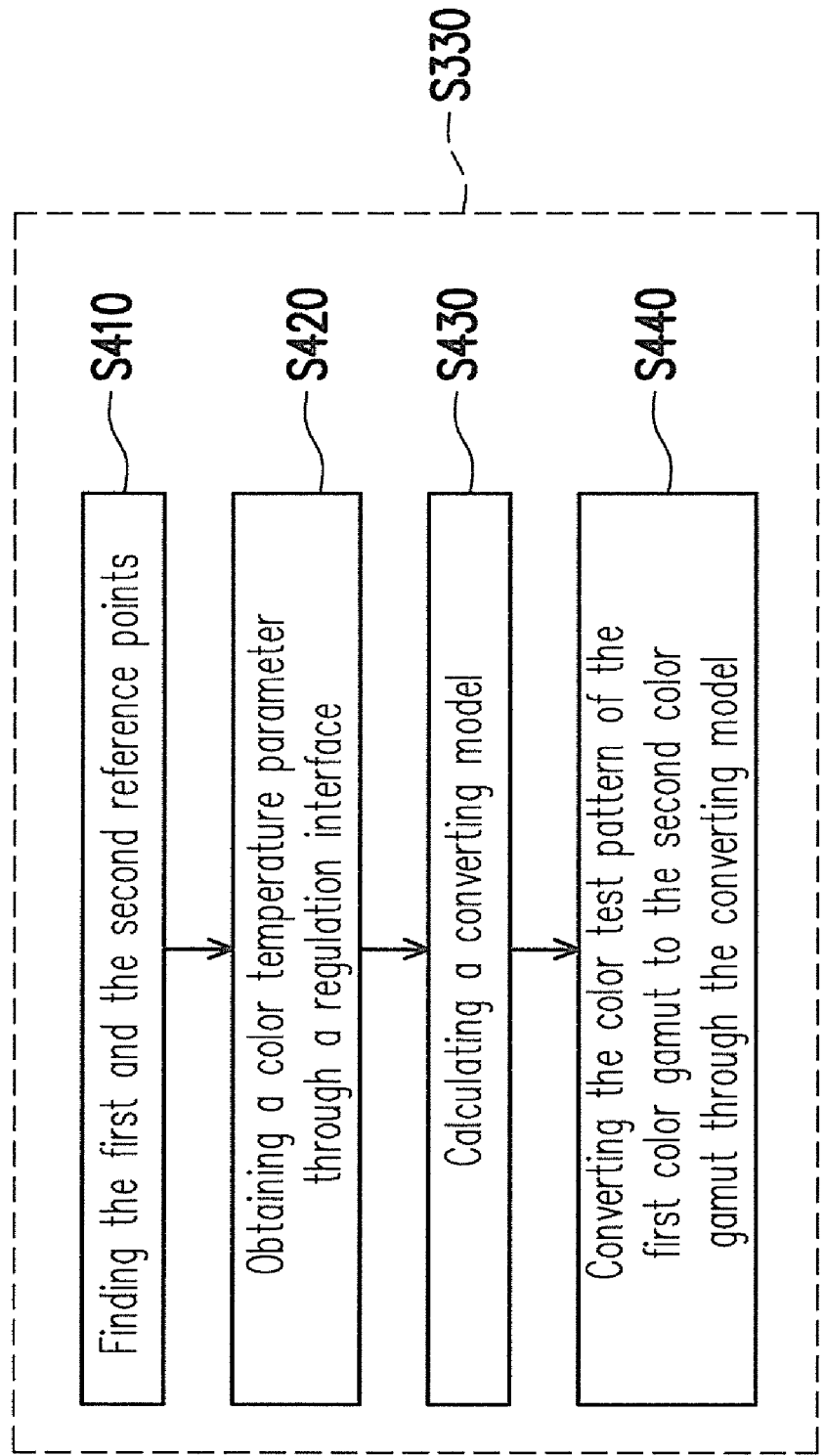
FIG. 4 is a flowchart illustrating sub steps of a step S330.

Referring to FIG. 4, first, a first and a second reference points are respectively found from the color gamuts (step S410). The first reference point is a white point in the first color gamut, and is represented by $(T\_WP_X, T\_WP_Y, T\_WP_Z)$ in the X-Y-Z color space. The second reference point is a white point in the second color gamut, and is represented by $(C\_WP_X, C\_WP_Y, C\_WP_Z)$ in the X-Y-Z color space. Next, a color temperature parameter (referred to as Temp) is obtained via a regulation interface (Step S420), wherein the regulation interface is an operation interface of a user. The user can regulate a desired color temperature via the operation interface. Next, a third reference point in a third color gamut is found according to the color temperature parameter Temp. Wherein, the third color gamut is the desired color distribution, and the third reference point is a white point in the third color gamut, and is represented by $(U\_WP_X, U\_WP_Y, U\_WP_Z)$ in the X-Y-Z color space. Moreover, an environmental light source reference point in the first color gamut, the second color gamut and the third color gamut is a D50 white point, and is represented by $(D\_WP_X, D\_WP_Y, D\_WP_Z)$ in the X-Y-Z color space.

Next, a converting model is calculated according to positions of the first, the second and the third reference points in the first color space (step S430). In the present embodiment, the converting model can be mathematically represented by a matrix $M_{CA}$, and a value thereof is $$M_{CA} = K_\alpha M_A K_\beta^D M_A^{-1}, \quad (1)$$

wherein $K_\alpha$ is a scaling coefficient, and a value thereof is $$K_\alpha = \frac{T\_WP_Y}{C\_WP_Y},$$

and $K_\beta^D$ is a diagonal matrix, and a value thereof is $$K_\beta^D = \text{diag}\left(\frac{U\_WP_x}{D\_WP_x}, \frac{U\_WP_Y}{D\_WP_Y}, \frac{U\_WP_z}{D\_WP_z}\right), -1$$

represents an anti-matrix operation, diag(·) represents a diagonal matrix with elements on the diagonal thereof being sequentially formed by internal vectors, and $M_A$ is a 3×3 reference coordinates converting matrix. Moreover, according to the mathematic equation (1), the converting model $M_{CA}$ is a 3×3 matrix.

After the converting model $M_{CA}$ is obtained, the color test pattern $XYZ_{D\text{-}ref}$ of the first color gamut is converted to the second color gamut via the converting model $M_{CA}$ (step S440), so that the color test pattern is distributed to the second color gamut. Wherein, the color test pattern converted to the second color gamut is represented by $XYZ_{D\text{-}ill}$, and a value thereof is $XYZ_{D\text{-}ill}=M_{CA}XYZ_{D\text{-}ref}\ldots(2)$. A physical meaning of the mathematic equations (1) and (2) is that the color test pattern $XYZ_{D\text{-}ref}$ of the first color gamut is first converted to the desired third color gamut based on the first reference point and the third reference point, and then the color test pattern of the third color gamut is converted to the second color gamut based on the third reference point and the second reference point.

Referring to FIG. 3 again, finally, the current display model unit 226 receives the color test pattern $XYZ_{D\text{-}ill}$ converted to the second color gamut, and converts the color test pattern of the second color gamut to the R-G-B color space according to the current display model (step S340), so as to distribute the color test pattern to the second color gamut in the R-G-B color space.

In the present embodiment, the current display is the currently driven display, and the current display model is a N×N matrix represented by $M_C$, wherein N is a dimension of the color space. In the present embodiment, a value of N is 3. The color test pattern $XYZ_{D\text{-}ill}$ converted by the current display model unit 226 is represented by $RGB_{D\text{-}ill}$, and a value thereof is $RGB_{D\text{-}ill}=M_C^{-1}\times XYZ_{D\text{-}ill}$. In the present embodiment, the color test pattern $RGB_{D\text{-}ill}$ distributed in the second color gamut of the R-G-B color space is input to the luminance regulation module 120. According to the aforementioned mathematic equations, it is known that the color test pattern $RGB_{D\text{-}ill}$ is a 256×3 matrix.

According to the aforementioned operations of the color distribution regulation module, during the color gamut conversion, not only the third color gamut obtained according to the color temperature parameter regulated by the user is referenced, but also the second color gamut of the current display is also referenced. Therefore, during regulation of the color features, the characteristic of the current display is also taken into consideration, so that after the regulation, color enrichment of the displayed image is more obvious.

Figure 5:
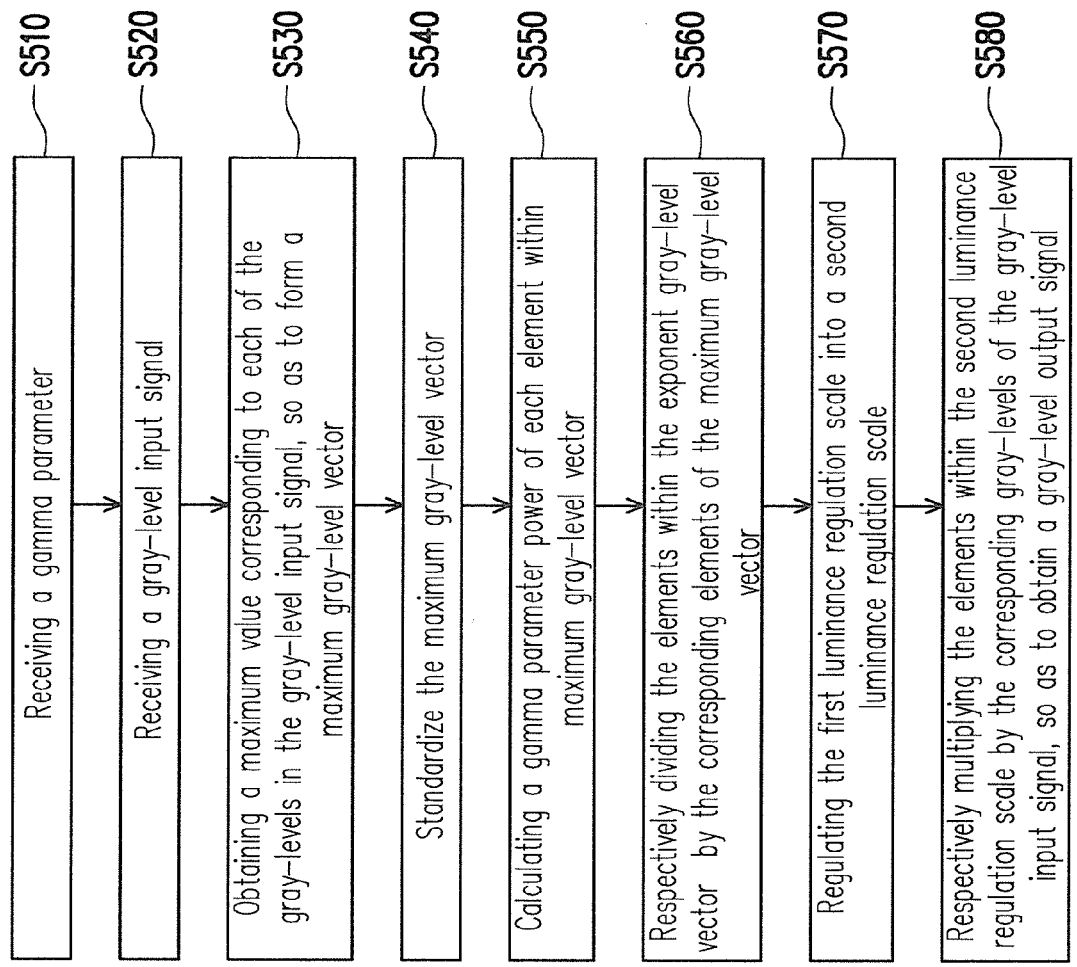
FIG. 5 is a flowchart illustrating a luminance regulation method according to an embodiment of the present invention.

Referring to FIG. 1 again, taking the luminance regulation module 120 as example, it executes a luminance regulation method, and a flowchart thereof is shown in FIG. 5. In the following content, regulation of the color luminance is described in coordination with the luminance regulating method. First, the luminance regulation module 120 receives a gamma parameter (step S510), and the gamma parameter is obtained via a regulation interface. In other words, the gamma parameter is a parameter that can be regulated by the user. Next, the luminance regulation module 120 receives a gray-level input signal (step S520), wherein the gray-level input signal is the color test pattern $RGB_{D\text{-}ill}$ converted by the color distribution regulation module 110.

According to the operation of the color distribution regulation module 110, the gray-level input signal $RGB_{D\text{-}ill}$ belongs to the R-G-B color space, and respectively has L gray-levels in the RGB coordinates directions. In the present embodiment, a value of L is 256. Therefore, the gray-level input signal $XYZ_{D\text{-}ill}$ is a 256×3 matrix that can be represented by $$RGB_{D\text{-}ill} = \begin{bmatrix} R_{in\_0} & G_{in\_0} & B_{in\_0} \\ R_{in\_1} & G_{in\_1} & B_{in\_1} \\ \vdots & \vdots & \vdots \\ R_{in\_255} & G_{in\_255} & B_{in\_255} \end{bmatrix}_{256\times 3}.$$

Next, after the gray-level input signal is received, the luminance regulation module 120 obtains a maximum value corresponding to each of the gray-levels in the gray-level input signal $RGB_{D\text{-}ill}$, so as to form a maximum gray-level vector (step S530). According to the above mathematic equation of $RGB_{D\text{-}ill}$, the luminance regulation module 120 obtains the maximum value of the elements in each column of the gray-level input signal $RGB_{D\text{-}ill}$. Namely, the each of the elements within the maximum gray-level vector is formed by the maximum value of the elements in each column of the gray-level input signal $RGB_{D\text{-}ill}$. In the present embodiment, the maximum gray-level vector is represented by $V_{max}=[V_{max\_0} \; V_{max\_1} \ldots V_{max\_255}]$, wherein element values are $V_{max\_0}=\max\{R_{in\_0}, G_{in\_0}, B_{in\_0}\}$, of $V_{max\_1}=\max\{R_{in\_1}, G_{in\_1}, B_{in\_1}\}, \ldots, V_{max\_255}=\max\{R_{in\_255}, G_{in\_255}, B_{in\_255}\}$, a $\max\{\cdot\}$ and represents obtaining a maximum value.

Next, the luminance regulation module 120 standardizes the maximum gray-level vector $V_{max}$ (step S540), and the standardized maximum gray-level vector $\underline{V_{max}}$ is $\underline{V_{max}} = \left[ \dfrac{V_{max\_0}}{S} \; \dfrac{V_{max\_1}}{S} \ldots \dfrac{V_{max\_L-1}}{S} \right]$.

Wherein, S is a standardized parameter, and a value thereof is the maximum value in the elements of the maximum gray-level vector before the standardization. In other words, $S=\max\{V_{max\_0}, V_{max\_1}, \ldots, V_{max\_255}\}$. According to the above mathematic equation, each of the element values in the standardized maximum gray-level vector $\underline{V_{max}}$ is between 0-1. For simplicity's sake, the standardized maximum gray-level vector $\underline{V_{max}}$ is represented by $[\overline{V}_{max\_0} \; \overline{V}_{max\_1} \ldots \overline{V}_{max\_255}]$.

Next, the luminance regulation module 120 calculates a gamma parameter power of each element within the standardized maximum gray-level vector $\underline{V_{max}}$ (step S550), so as to obtain an exponent gray-level vector. Wherein, the gamma parameter is the parameter received in the step S510, and is represented by Gamma. The exponent gray-level vector is represented by $\max V_{max}^{Gamma}$, and a value thereof is $V_{max}^{Gamma}[(\overline{V}_{max\_0})^{Gamma} \; (\overline{V}_{max\_1})^{Gamma} \ldots (\overline{V}_{max\_255})^{Gamma}]$.

Next, the luminance regulation module 120 respectively divides the elements within the exponent gray-level vector $V_{max}^{Gamma}$ by the corresponding elements of the maximum gray-level vector $\underline{V_{max}}$, as to obtain a first luminance regulation scale (step S560). Wherein, the first luminance regulation scale is represented by $\underline{M}$, and a value thereof is $$\underline{M} = \left[ \dfrac{(\overline{V}_{max\_0})^{Gamma}}{\overline{V}_{max\_0}} \; \dfrac{(\overline{V}_{max\_1})^{Gamma}}{\overline{V}_{max\_1}} \ldots \dfrac{(\overline{V}_{max\_255})^{Gamma}}{\overline{V}_{max\_255}} \right].$$

Next, the luminance regulation module 120 regulates the first luminance regulation scale $\underline{M}$ into a second luminance regulation scale according to a strength parameter (step S570). Wherein, the strength parameter is a parameter obtained via the aforementioned regulation interface, and is represented by Strength, and a value thereof is between 0-1. The second luminance regulation scale is represented by $\underline{\alpha}=[\alpha_0 \; \alpha_1 \ldots \alpha_{255}]$ and a value thereof is $\underline{\alpha}=(1-\text{Strength})+$ $\underline{M} \times \text{Strength}$. In other words, each of the elements in the second luminance regulation scale $\underline{\alpha}$ is $$\alpha_i = (1 - \text{Strength}) + \left( \dfrac{(\overline{V}_{max\_i})^{Gamma}}{\overline{V}_{max\_i}} \right) \times \text{Strength},$$

wherein i is an integer between 0-255.

In the present embodiment, the strength parameter Strength is used for fine-tuning the luminance parameter, so that the luminance regulated by the luminance regulation module 120 is not only influenced by the gamma parameter Gamma. In other words, a regulation scale of the luminance regulated by the gamma parameter Gamma can be reduced by the strength parameter Strength. If Strength=1, the luminance regulation scales $\underline{M}$ and $\underline{\alpha}$ are the same, and the regulation scale of the luminance regulated by the gamma parameter Gamma is not reduced. If Strength=0, the second luminance regulation scale $\underline{\alpha}=0$, and now the luminance is totally not influenced by the gamma parameter Gamma. Namely, the luminance regulation module 120 does not regulate the luminance of the gray-level input signal $RGB_{D\text{-}ill}$.

Finally, after the second luminance regulation scale $\underline{\alpha}$ a is obtained, the luminance regulation module 120 respectively multiplies the elements within the second luminance regulation scale $\underline{\alpha}$ by the corresponding gray-levels of the gray-level input signal, so as to obtain a gray-level output signal (step S580). In detail, regarding the R coordinates direction in the color space, a set of the gray-levels of the gray-level input signal $RGB_{D\text{-}ill}$ in the R coordinates direction is represented by $\{R_{in\_0}, R_{in\_1}, \ldots, R_{in\_255}\}$, and a set of the gray-levels of the gray-level output signal in the R coordinates direction is represented by $\{R_{out\_0}, R_{out\_1}, R_{out\_255}\}$, wherein $R_{out\_0}=\alpha_0 \times R_{in\_0}, R_{out\_1}=\alpha_1 \times R_{in\_1}, \ldots, R_{out\_255}=\alpha_{255} \times R_{in\_255}$. Similarly, in the step S580, sets of the gray-levels of the gray-level output signal in the G and B coordinates direction are respectively represented by $\{G_{out\_0}, G_{out\_1}, \ldots, G_{out\_255}\}$ and $\{B_{out\_0}, B_{out\_1}, B_{out\_255}\}$, wherein $G_{out\_i}=\alpha_i \times G_{in\_i}, B_{out\_i}=\alpha_i \times B_{in\_i}$, and i is an integer between 0-255. The luminance regulation module 120 outputs the calculated gray-level output signal to the saturation regulation module 130.

Figure 6:
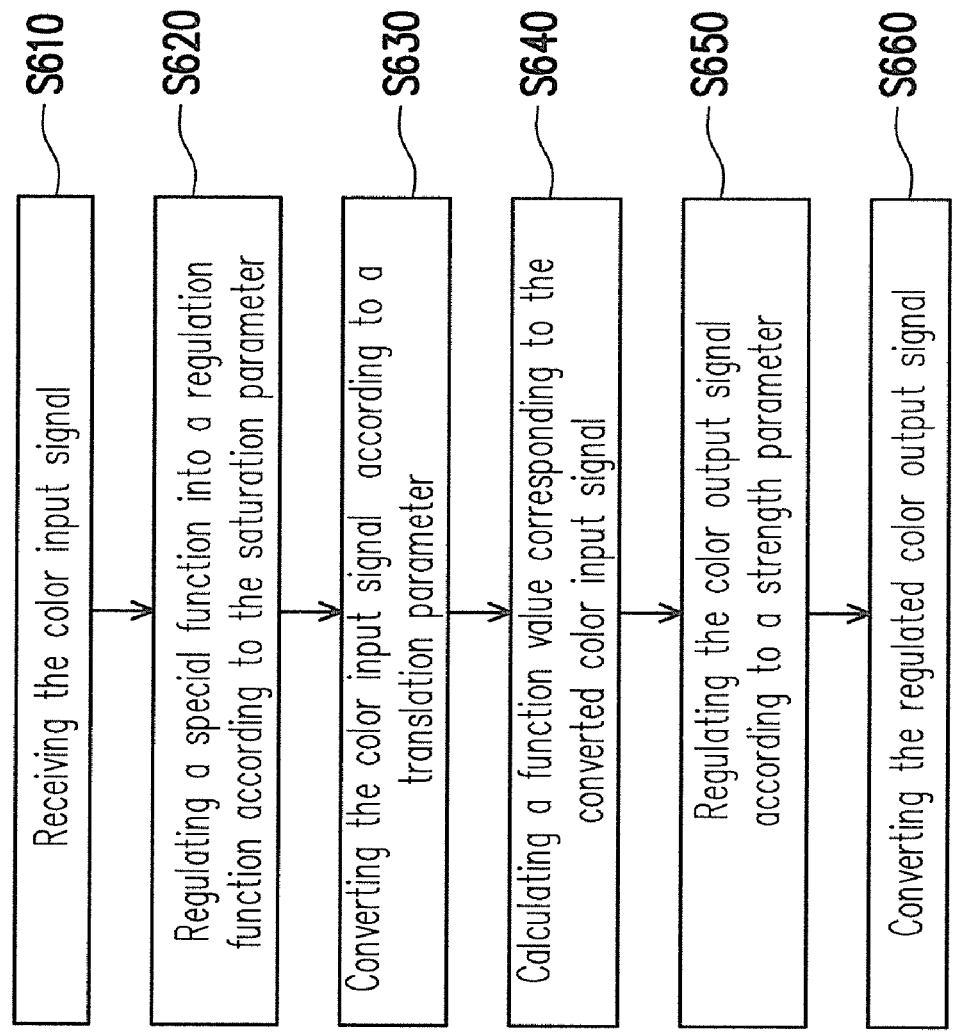
FIG. 6 is a flowchart illustrating a saturation regulation method according to an embodiment of the present invention.

Referring to FIG. 1 again, taking the saturation regulation module 130 as example, it executes a saturation regulation method, and a flowchart thereof is shown in FIG. 6. In the following content, regulation of the color saturation is described in coordination with the saturation regulation method. First, the saturation regulation module 130 receives a color input signal (step S610). In the present embodiment, the color input signal received by the saturation regulation module 130 is the gray-level output signal output by the luminance regulation module 120. Therefore, according to the aforementioned operation of the luminance regulation module 120, it is known that the gray-level output signal contains the RGB three coordinates directions, and has a plurality of gray-levels (including $\{R_{out\_0}, R_{out\_1}, \ldots R_{out\_255}\}, \{G_{out\_0}, G_{out\_1}, \ldots, G_{out\_255}\}$ and $\{B_{out\_0}, B_{out\_1}, \ldots, B_{out\_255}\}$) in each of the coordinates directions.

Since the saturation regulations performed by the saturation regulation module 130 for each of the gray-levels in the coordinates direction are similar, any gray-level in the R coordinates direction is taken as an example, and is represented by $R_{in}$. In other words, in the following embodiment, assuming the color input signal is $R_{in}$, and the saturation regulation module 130 only performs the saturation regulation to the color input signal $R_{in}$.

Figure 7:
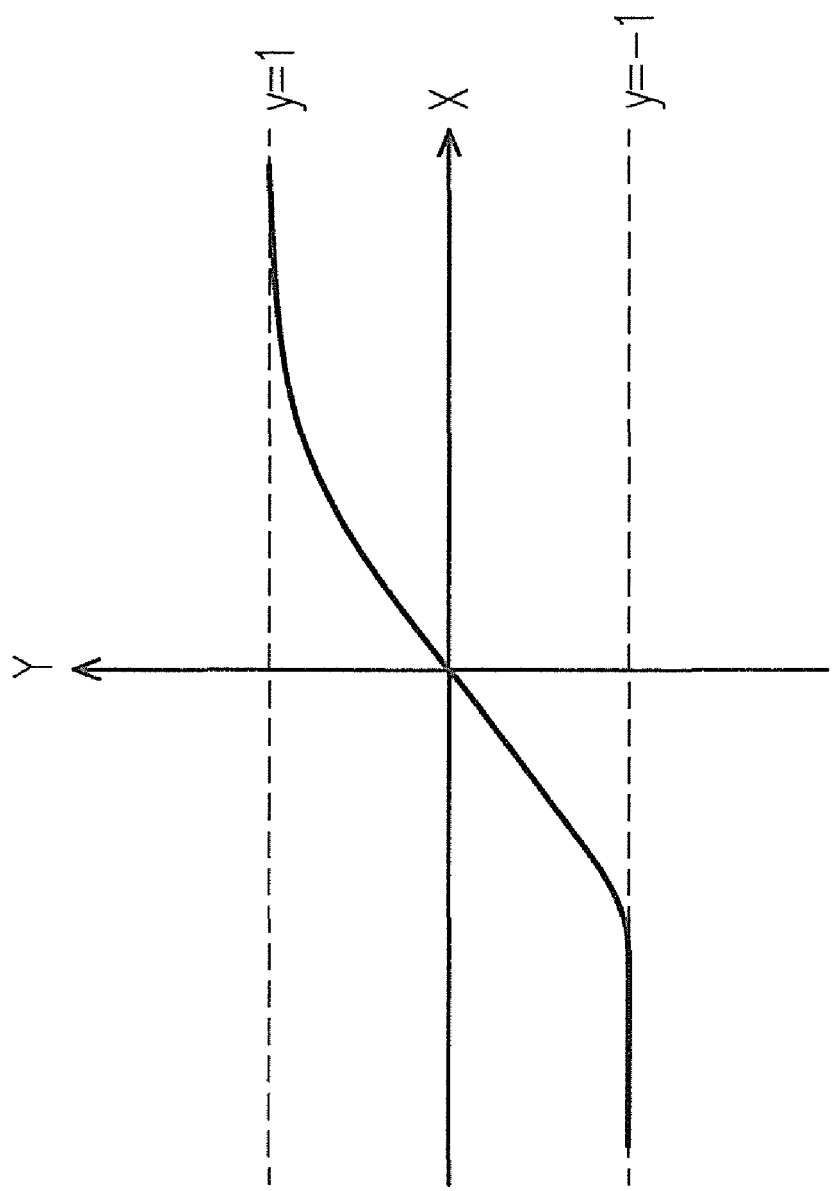
FIG. 7 is a diagram of a special function.

Next, the saturation regulation module 130 receives a saturation parameter (referred to as Sat), and regulates a special function into a regulated function according to the saturation parameter (step S620). Wherein, the special function is a one-to-one and onto function, and is represented by Y=F(X). For simplicity's sake, the special function is a hyperbolic tangent function of a hyperbolic function, which is represented by Y=tan h(X), and a function figure thereof is shown in FIG. 7. The saturation function Sat is obtained via the aforementioned regulation interface, so that the user can regulates the color saturation through the saturation function Sat.

Figure 8:
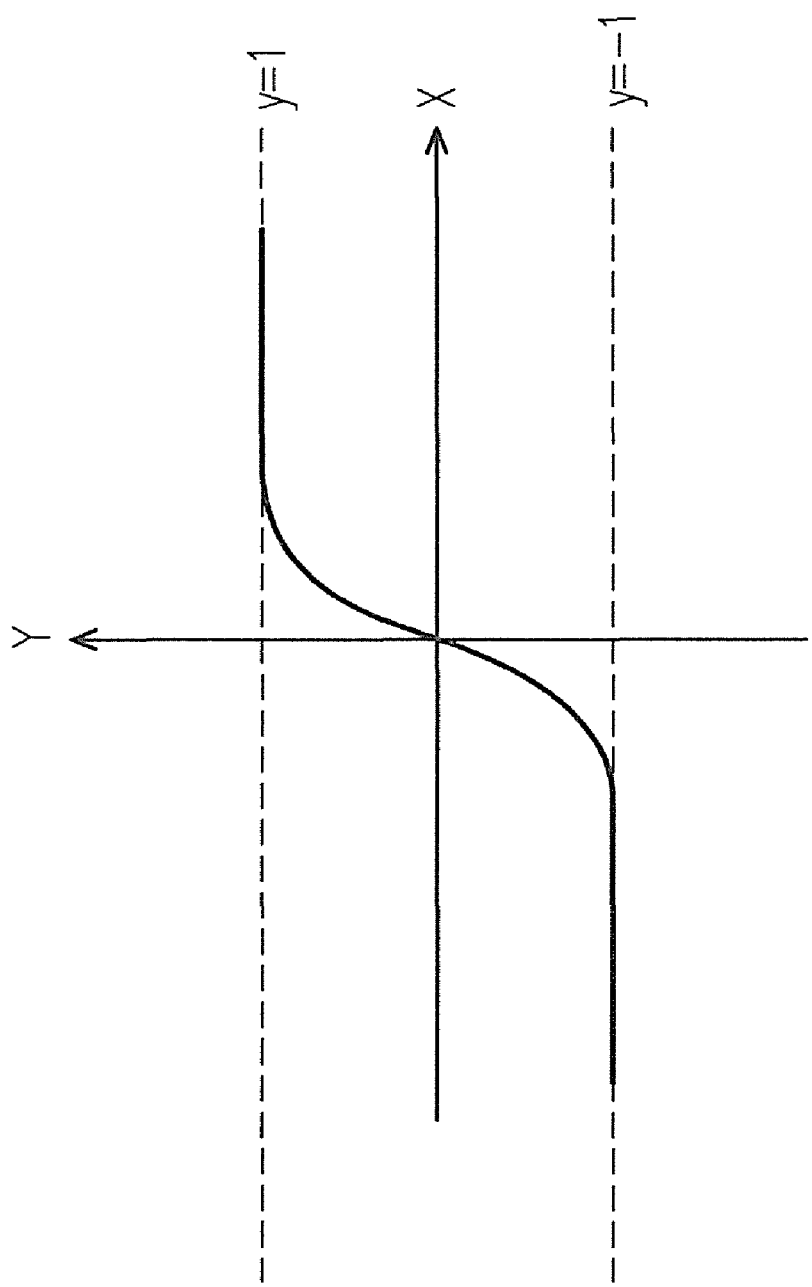
FIG. 8 is a diagram of a regulated function.

In the step S620, the saturation regulation module 130 regulates a curvature of the function Y=tan h(X) according to the saturation function Sat, and the adjusted regulated function is represented by Y=tan h[$(S_2 \times Sat+1) \cdot X$], wherein $S_2$ is a predetermined parameter. Here, if a multiplication of the predetermined parameter $S_2$ and the saturation parameter Sat is a positive number, the curvature of the regulation parameter is then greater than that of the original special function, and the function figure of the regulated function is shown in FIG. 8.

Figure 9:
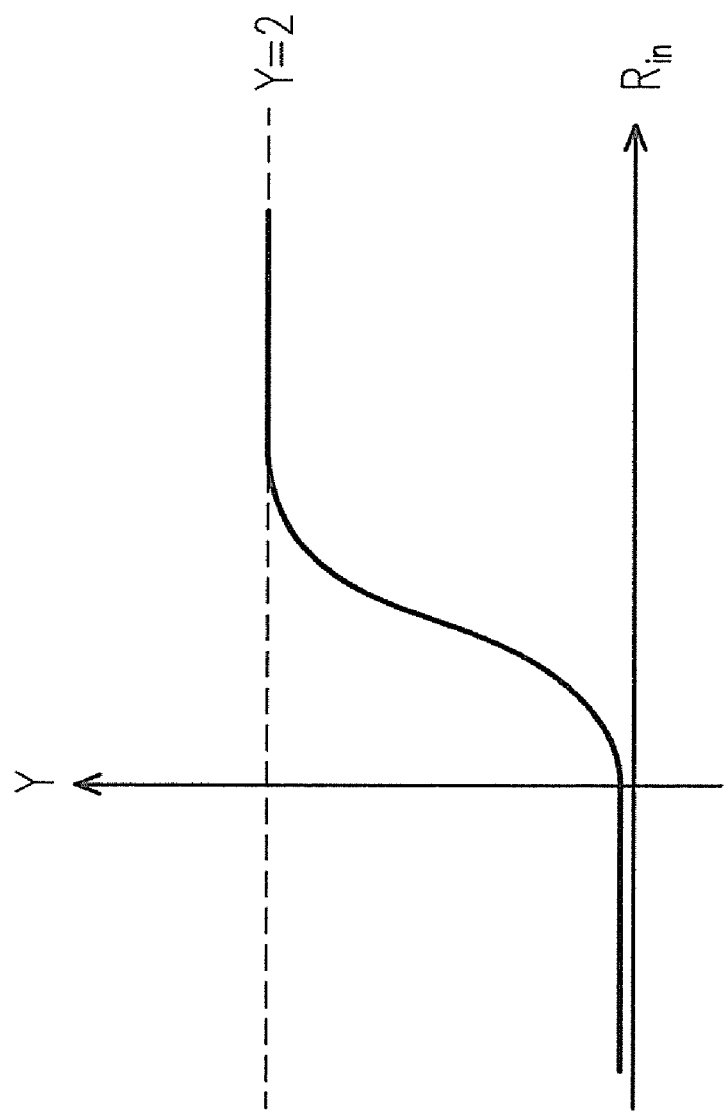
FIG. 9 is a diagram of a regulated function after translation.

Next the saturation regulation module 130 converts the color input signal $R_{in}$ into $r_{in}$ according to a translation parameter (step S630). Wherein, the translation parameter is represented by D, the converted color input signal is represented by $r_{in}$, and a relation of $r_{in}$ and $R_{in}$ is $r_{in}=(R_{in}-D)/D$, wherein D is a positive number. In the present embodiment, the color input signal $R_{in}$ serves as a definition domain of the regulated function, and the step of converting the color input signal $R_{in}$ into $r_{in}$ is to perform coordinate conversion and translation to the regulated function. Therefore, if the regulated function is represented by Y=tan h[$(S_2 \times Sat+1) \cdot R_{in}$], a function figure thereof is shown in FIG. 9.

Next, the saturation regulation module 130 calculates a function value corresponding to the converted color input signal $r_{in}$ (step S640), and outputs the function value corresponding to the $r_{in}$ as a color output signal. Wherein, the color output signal is represented by $h_r$ and a value thereof is $h_r = S_r \times$ tan h[$(S_2 \times Sat+1) \cdot r_{in}$], wherein $S_r$ is a scaling parameter used for linearly amplifying or reducing the function value corresponding to $r_{in}$, so that the value of the color output signal $h_r$ can be within a designed range.

Next, the saturation regulation module 130 regulates the color output signal $h_r$ into $r_{out}$ according to a strength parameter (step S650). Wherein, the strength parameter is a parameter obtained via the aforementioned regulation interface, and is represented by Str, and a value thereof is between 0-1. The regulated color output signal $h_r$ is represented by $r_{out}$, and a value thereof is $r_{out}=(1-Str) \times r_{in} + Str \times h_r$. The strength parameter Str is similar to the strength parameter Strength of the luminance regulation module 120, and is used for further fine-tuning the saturation parameter, so that the luminance regulated by the saturation regulation module 130 is not only influenced by the saturation parameter Sat.

Finally, the saturation regulation module 130 converts the regulated color output signal $r_{out}$ into $R_{out}$ (step S660). Wherein, $R_{out}$ represents the converted color output signal, and a relation of $r_{out}$ and $R_{out}$ is $R_{out}=r_{out} \times D+D$, wherein D is the translation parameter utilized in the step S630. Since in the step S630, coordinates conversion and coordinates translation have been performed by the saturation regulation module 130, after the color output signal $r_{out}$ is calculated, the saturation regulation module 130 has to restore the coordinates according to the original translation parameter D in the step S660, so as to obtain an actual value of the color output signal $R_{out}$.

Moreover, though any gray-level in the R coordinates direction is taken as an example, since saturation degree regulations of a plurality of the gray-levels ({$R_{out\_0}$, $R_{out\_1}$, . . . , $R_{out\_255}$}, {$G_{out\_0}$, $G_{out\_1}$, . . . , $G_{out\_255}$} and {$B_{out\_0}$, $B_{out\_1}$, . . . , $B_{out\_255}$}) in each of the coordinates directions are similar, a corresponding color output signal $R_{out}$ can be found from each of the gray-levels in the RGB three coordinates directions. It should be noted that since value ranges of the input gray-levels for the coordinates directions are different, or the saturation degrees to be regulated are different, the scaling parameter $S_r$, the translation parameter D or the predetermined parameter $S_2$ can be varied according to different coordinates directions.

According to the aforementioned operations of the saturation modulation module 130, it is known that in the present embodiment, an input/output relation is obtained according to the corresponding relation of the definition domain and the value domain of the special function. In other words, during regulation of the color saturation, the saturation degree of the color output signal can be directly regulated by just regulating the special function, and finding the input/output relation by looking up a table is unnecessary. Moreover, in the present embodiment, the special function is the hyperbolic tangent function, though those skilled in the art should understand that the special function can also be a hyperbolic cosine function, a hyperbolic sine function or other types of function.

Referring to FIG. 1 again, after the color test pattern TP is regulated by the color distribution regulation module 110, the luminance regulation module 120 and the saturation regulation module 130, the color temperature, the luminance and the saturation thereof are all regulated according to the parameters set by the user. Finally, the processing module 140 calculates the gamma ramps according to the regulated color test pattern (i.e. the color output signal $R_{out}$ corresponding to each of the gray-levels, that is output by the saturation modulation module). After the processing module 140 obtains the gamma ramps, the gamma ramps can be stored in a display card or a display chip of a computer system, so that the display card can regulate a signal output to a display device according to the obtained gamma ramps. In other words, images displayed by the display device may have a better color hue without executing a color enrichment software by the computer system.

Figure 10:
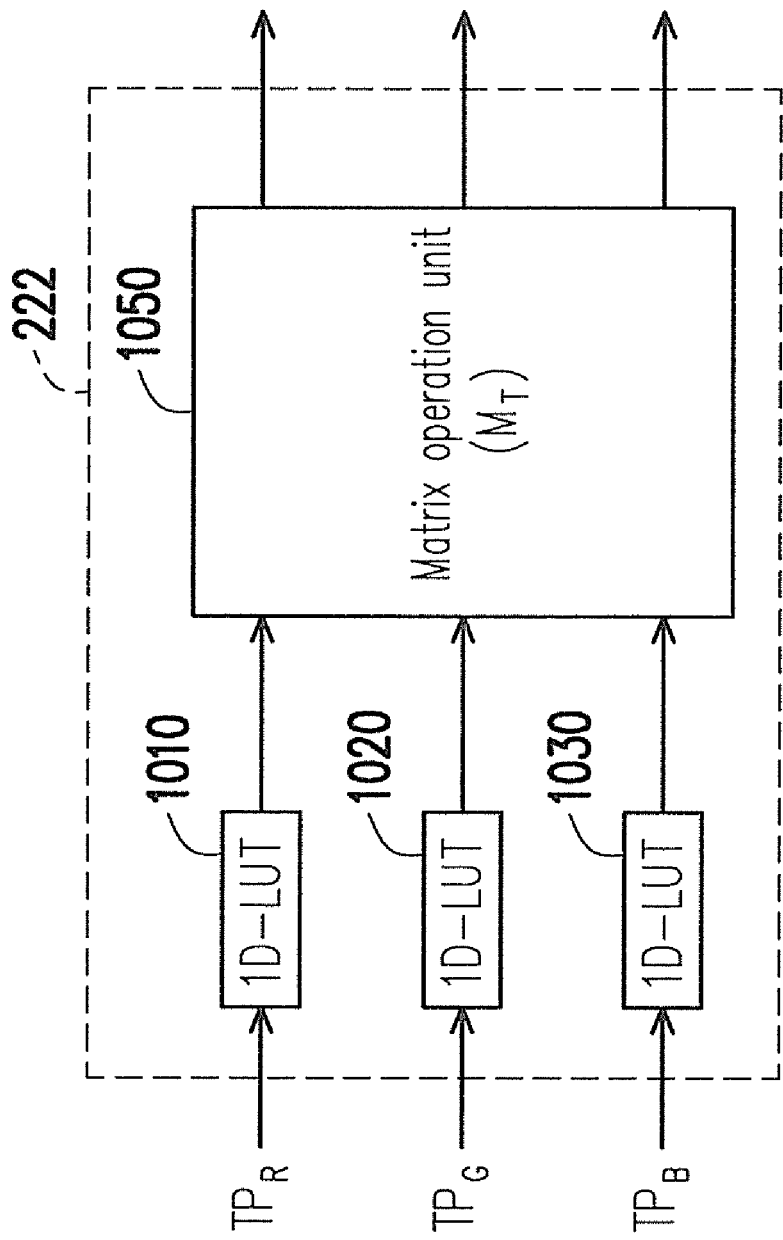
FIG. 10 is a system block diagram illustrating a target display model unit 222.

The target display model unit 222 of the color distribution regulation module 110 converts the color test pattern TP from the R-G-B color space to the X-Y-Z color space. Regarding a current image processing technique, the target display model unit 222 includes a plurality of one dimension look-up tables (1D-LUT) 1010-1030 and a matrix calculation unit 1050 shown as FIG. 10. The aforementioned color test pattern TP is grouped into data $TP_R$ of the R coordinates direction, data $TP_G$ of the G coordinates direction and data $TP_B$ of the B coordinates direction. The matrix calculation unit 1050 includes a target display model, for example, the aforementioned matrix $M_T$. Data corresponding to the data $TP_R$, $TP_G$ and $TP_B$ of the three coordinates directions of the color test pattern are respectively found by the 1-D LUTs 1010-1030, and the data output from the -D LUTs 1010-1030 is multiplied by the matrix $M_T$ via the matrix calculation unit 1050, so as to be converted to the X-Y-Z color space.

Figure 11:
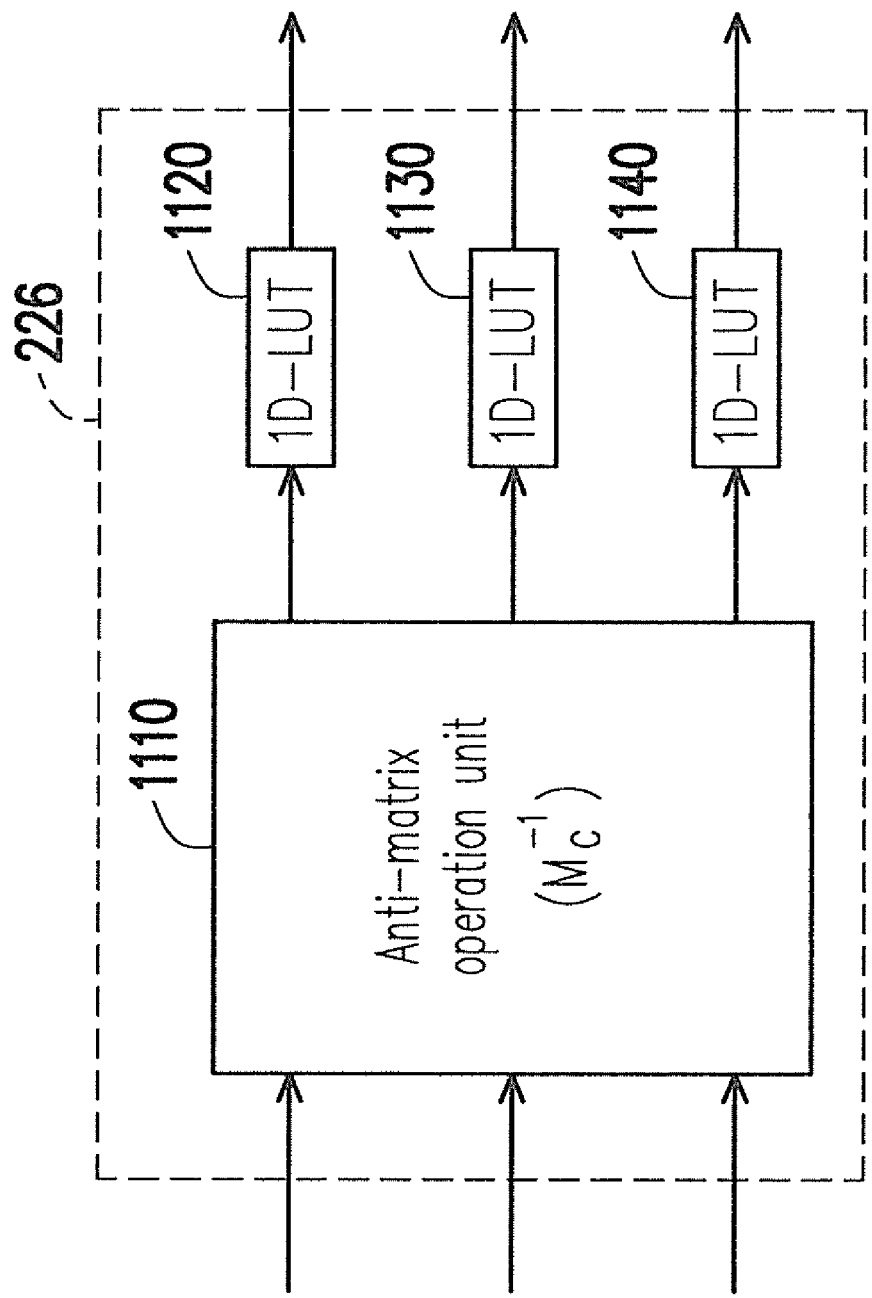
FIG. 11 is a system block diagram illustrating a current display model unit 226.

Similarly, the current display model unit 226 includes an anti-matrix operation unit 1110 and a plurality of one dimension inversion look-up tables (1D-ILUT) 1120-1140 shown in FIG. 11. The color test pattern $XYZ_{D\text{-}ref}$ is grouped into data $X_{D\text{-}ref}$ of the X coordinates direction, data $Y_{D\text{-}ref}$ of the G coordinates direction and data $Z_{D\text{-}ref}$ of the B coordinates direction. The anti-matrix operation unit 1110 includes a current display model, for example, the aforementioned matrix $M_C$. After the data $X_{D\text{-}ref}$, $Y_{D\text{-}ref}$ and $Z_{D\text{-}ref}$ of the three coordinates directions of the color test pattern are multiplied by the anti-matrix $M_C^{-1}$ of the matrix $M_C$ via the anti-matrix operation unit 1110, the data is converted to the R-G-B color space. Then, the corresponding data are found by the 1D-ILUTs 1120-1140.

Figure 12:
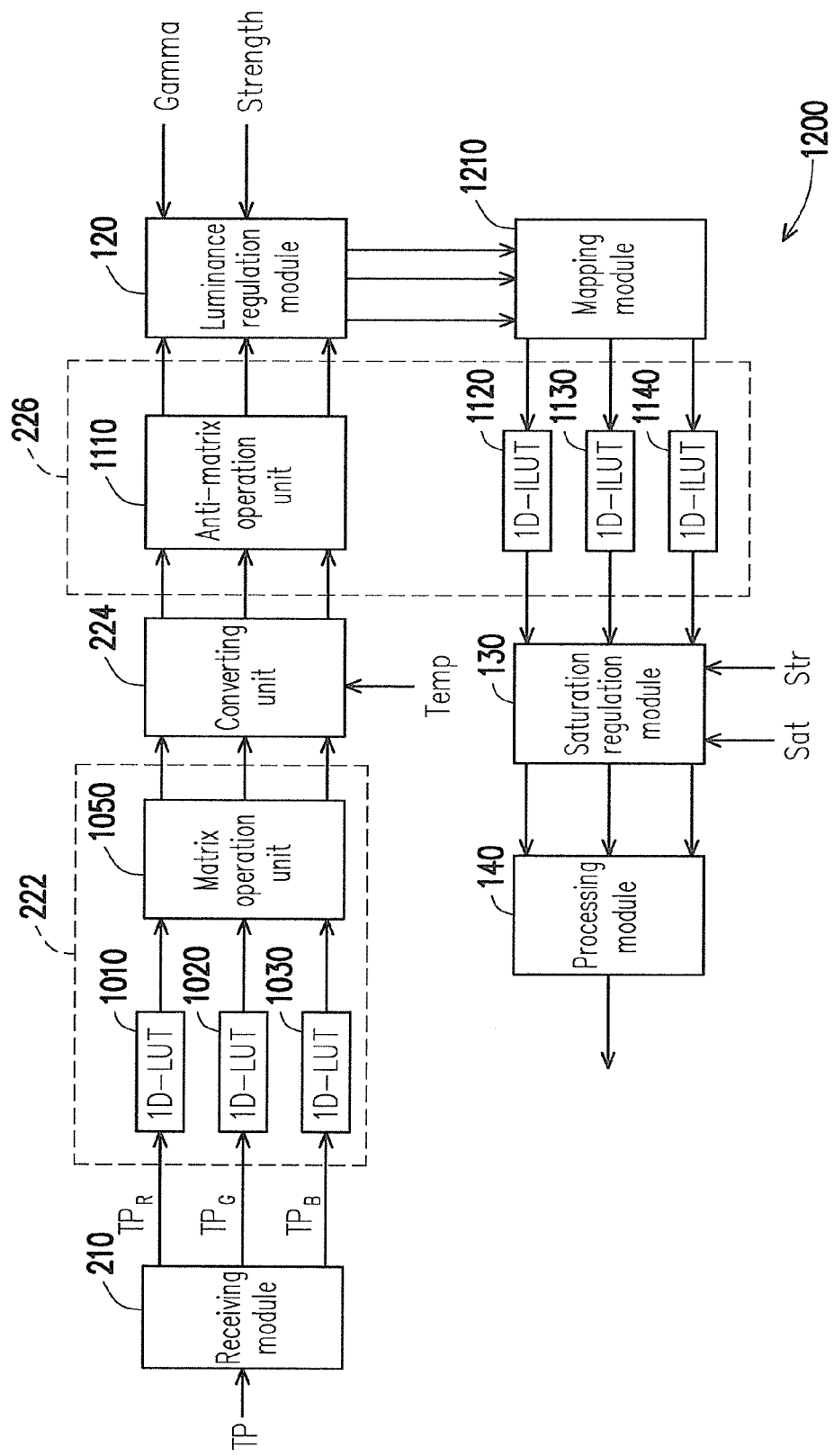
FIG. 12 is a block diagram illustrating a color regulation system according to another embodiment of the present invention.

According to the above embodiment, according to FIGS. 1-2 and FIGS. 10-11, the color regulation system can be illustrated in FIG. 12. Referring to FIG. 12, the color regulation system 1200 includes a receiving module 210, a target display model unit 222, a converting unit 224, a current display model unit 226, a luminance regulation module 120, a mapping module 1210, a saturation regulation module 130 and a processing module 140. The components within the color regulation system 1200 are similar to that shown in FIGS. 1-2 and FIGS. 10-11, while the color regulation system 1200 further includes a mapping module 1210, which is used for evenly distributing the output of the luminance regulation module 120 to a predetermined range.

In the above embodiment, though the processing module 140 obtains the gamma ramps by calculating the color test pattern regulated by the aforementioned units, those skilled in the art should understand that the spirit of the present invention lies in how to regulates the color features of the display device, and is not limited to the case that the gamma ramps is obtained based on calculation.

In summary, the present invention has at least the following advantages:

1. During regulation of the color features, a characteristic of the current display itself is taken into consideration, so that the display device can maintain a maximum color gamut range under different color temperature parameters. Therefore, after the regulations of the color features are accomplished, the color enrichment effect can be achieved.

2. Since the gamma ramps obtained based on the color regulation can be applied to the current display card or the display chip, so that the color hue of the display device can be improved without an extra hardware cost of the computer system. Moreover, the display card can also directly regulates the signal output to the display device according to the obtained gamma ramps, so that increase of a calculation burden of the CPU can be avoided.

3. The input/output relation is obtained according to the corresponding relation of the definition domain and the value domain of the special function. In other words, during regulation of the color saturation, the saturation degree of the color output signal can be directly regulated by just regulating the curvature of the special function, and finding the input/output relation by looking up a table is unnecessary.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for regulating color saturation degree, comprising:
   providing a saturation parameter and a special function;
   receiving a color input signal, which is represented by $R_{in}$;
   regulating a curvature of the special function in all positions by the saturation parameter to obtain a regulated function;
   providing a translation parameter represented by D;
   converting the color input signal into $R_{in}$ into $r_{in}$ according to the translation parameter, wherein a relation of $r_{in}$ and $R_{in}$ is $r_{in}=(R_{in}-D)/D$; and
   assigning the color input signal as an independent variable of the regulated function to calculate a color output signal corresponding to the color input signal.

2. The method for regulating saturation degree as claimed in claim 1, wherein the special function is a one-to-one function represented by $Y=F(X)$.

3. The method for regulating saturation degree as claimed in claim 2, wherein the saturation parameter is represented by Sat, the step of regulating the curvature of the special function in all positions by the saturation parameter to obtain the regulated function comprises:
   providing a predetermined parameter represented by $S_2$; and
   converting the special function into the regulated function, wherein the regulated function is represented by $Y=F[(S_2 \times Sat+1) \cdot X]$.

4. The method for regulating saturation degree as claimed in claim 3, wherein the color input signal is represented by $r_{in}$, and the step of substituting assigning the color input signal as the independent variable of the regulated function to calculate the color output signal corresponding to the color input signal comprises:
   calculating the color output signal corresponding to the color input signal $r_{in}$ according to the regulated function, wherein the color output signal is represented by $h_r$, and a value thereof is $h_r=S_r \times F[(S_2 \times Sat+1) \cdot r_{in}]$, wherein $S_r$ is a scaling parameter.

5. The method for regulating saturation degree as claimed in claim 4 further comprising:
   providing a strength parameter represented by Str; and
   regulating the color output signal $h_r$ into $r_{out}$ according to the strength parameter Str, and a value thereof is $r_{out}=(1-Str) \times r_{in}+Str \times h_r$.

6. The method for regulating saturation degree as claimed in claim 1 further comprising:
   obtaining a strength parameter Str through a regulation interface, wherein a value of the strength parameter Str is between 0-1.

7. The method for regulating saturation degree as claimed in claim 1, wherein the color output signal is represented by $r_{out}$, and the method for regulating saturation degree further comprises:
   converting the color output signal $r_{out}$ into $R_{out}$ according to the translation parameter, wherein a relation of $r_{out}$ and $R_{out}$ is $R_{out}=r_{out} \times D+D$.

8. The method for regulating saturation degree as claimed in claim 1, wherein the special function is a hyperbolic function.

9. The method for regulating saturation degree as claimed in claim 1, wherein the special function comprises a hyperbolic tangent function, a hyperbolic cosine function and a hyperbolic sine function.

10. The method for regulating saturation degree as claimed in claim 1, wherein the color input signal belongs to a color space having a plurality of coordinates direction, and the color input signal is a component of any coordinates direction.

11. The method for regulating saturation degree as claimed in claim 1 further comprising:
   obtaining the saturation parameter through a regulation interface.

12. A computer system, comprising:
   a processor; and
   a saturation regulation module, executed by the processor, wherein the saturation regulation module is configured to include a plurality of steps of:
   providing a saturation parameter and a special function;
   receiving a color input signal, which is represented by $R_{in}$;
   regulating a curvature of the special function in all positions by the saturation parameter to obtain a regulated function;
   providing a translation parameter represented by D;
   converting the color input signal $R_{in}$ into $r_{in}$ according to the translation parameter, wherein a relation of $r_{in}$ and $R_{in}$ is $r_{in}=(R_{in}-D)/D$; and
   assigning the color input signal as an independent variable of the regulated function to calculate a color output signal corresponding to the color input signal.

* * * * *